United States Patent [19]

Greenspan

[11] 4,313,963
[45] Feb. 2, 1982

[54] METHOD FOR TENDERIZING CUT MEAT PORTIONS

[75] Inventor: Joseph Greenspan, Village of Evergreen Park, Ill.

[73] Assignee: Beatrice Foods Co., Chicago, Ill.

[21] Appl. No.: 179,464

[22] Filed: Aug. 19, 1980

[51] Int. Cl.³ .............................................. A23B 4/02
[52] U.S. Cl. ........................................ 426/58; 17/51; 17/52; 99/534; 426/264; 426/265; 426/281; 426/393; 426/414; 426/518; 426/641; 426/652
[58] Field of Search .................. 426/56, 58, 59, 74, 426/92, 129, 144, 264, 265, 281, 282, 302, 641, 646, 652, 393, 414, 513, 518, 524, 332; 17/51, 52, 25, 26, 28; 83/22, 24, 39, 51, 876, 878, 880, 885, 886, 867; 99/352, 353, 534

[56] References Cited

U.S. PATENT DOCUMENTS

| | | | |
|---|---|---|---|
| 2,398,636 | 4/1946 | Henney et al. | 426/518 X |
| 2,673,156 | 3/1954 | Minder | 426/513 |
| 3,149,554 | 9/1964 | Greenspan | 426/281 X |
| 3,154,423 | 10/1964 | Voegele et al. | 426/265 |
| 3,188,213 | 6/1965 | Delaney | 426/56 |
| 3,222,713 | 12/1965 | Stein et al. | 17/26 |
| 3,635,731 | 1/1972 | Korten | 426/518 X |
| 3,719,504 | 3/1973 | Greenspan et al. | 99/353 |
| 3,962,751 | 6/1976 | Wagner | 426/144 X |
| 3,971,854 | 7/1976 | Hinnergardt | 426/281 |
| 4,029,824 | 6/1977 | Langen | 426/641 X |

FOREIGN PATENT DOCUMENTS

| | | | |
|---|---|---|---|
| 874377 | 6/1971 | Canada | 426/518 |
| 2615003 | 11/1977 | Fed. Rep. of Germany | 426/281 |

*Primary Examiner*—Arthur L. Corbin
*Attorney, Agent, or Firm*—Murray & Whisenhunt

[57] ABSTRACT

There is provided a method for tenderizing cut portions of meat, wherein the portions are slit by passing the portions into a plurality of rotating slitting blades having a plurality of discrete cutting surfaces on each slitting blade along the periphery thereof. A series of closely spaced first cut slits are produced from at least one surface into the said portions. The portions are then sprayed with a tenderizer solution containing a tenderizing phosphate, and the solution penetrates into and is retained in the said first slits. Further slitting of the portions is achieved by passing the portions into a further assembly of the rotating slitting blades and a series of closely spaced further cut slits are placed on the portions. The further slits are close to or in part overlap the first slits and the solution penetrates from or flows from the first slits into the said further slits during the further slitting and subsequent thereto. Immediately thereafter the portions are packaged and fast frozen. The total volume of the first slits is sufficient to retain from 5% to 16% of the solution, and the number of first and further slits is sufficient that solution so penetrates or flows into the further slits from the first slits prior to the freezing step such that the solution is essentially uniformly dispersed in the portions and the portions are essentially uniformly tenderized.

20 Claims, 5 Drawing Figures

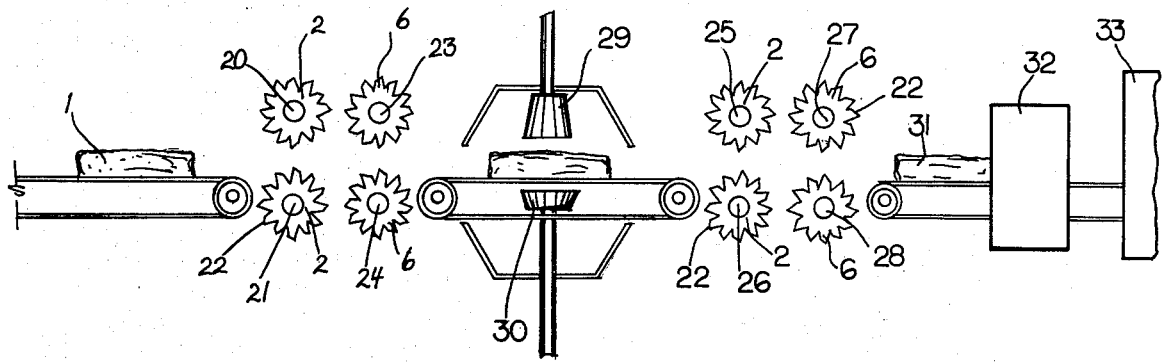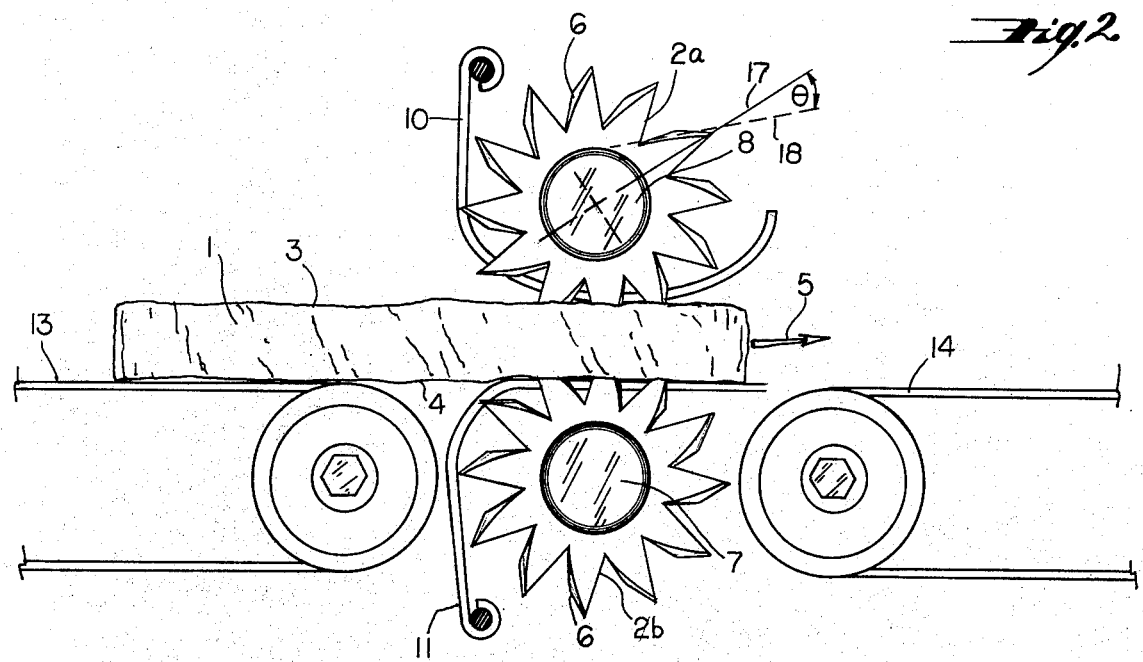

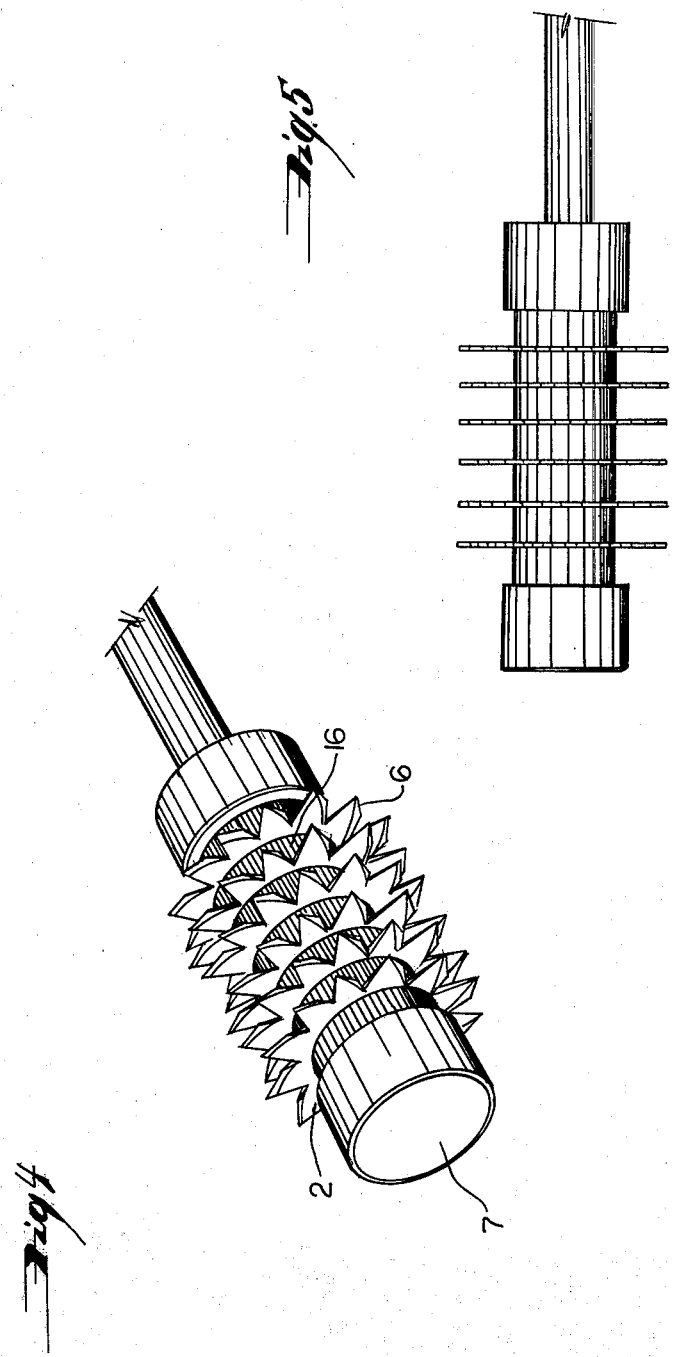

METHOD FOR TENDERIZING CUT MEAT PORTIONS

The present invention concerns a method for tenderizing cut portions of meat, and more particularly to a method wherein a tenderizing solution, containing a phosphate tenderizer, is uniformly dispersed in the meat portions by means of rotary slitting blades and subsequent infusion.

BACKGROUND OF THE INVENTION

The consumer acceptance of meat, e.g. beef, pork and polutry, depends, to a large measure, on the tenderness of the meat after cooking. When the meat is tough and fibrous, consumer acceptance is quite low. Meat prepared for home consumption and sold in local groceries and butcheries is normally of the more tender grades, e.g. choice or prime in the case of beef. To obtain those more tender grades, the animals or fowl must be carefully selected and in the case of beef, lot feeding of the beef is required in order to develop in the muscle tissue the desired amount of tenderness, including increases fat content, referred to a marbling. However, such lot feeding considerably increases the cost of the meat, and for this reason considerable effort has been expended in the art to provide methods for tenderizing less tender grades of meat, e.g. cutter, canner, utility or commercial grades in the case of beef. In addition, the more tender grades, e.g. choice grade in the case of beef, sometimes still do not have the degree of tenderness desired and the art has sought methods for improving the tenderness of these more tender grades.

Generally speaking, the efforts in the art for improving the tenderness of meat have taken three different approaches, i.e. aging, mechanical and chemical tenderization, although these approaches are not mutually exclusive. Aging the slaughtered meat is a traditional approach, but this requires cold storage of the meat for substantial lengths of time and considerably increases the cost of the meat. In addition, aging necessarily entails some loss of meat due to the aging process.

Mechanical tenderization of the meat is achieved by passing the meat through mechanical tenderizers. However, such mechanical tenderizers may substantially change the texture and appearance of the meat and, accordingly, render the meat less desirable, except in regard to certain cooking applications. Typical of such mechanical tenderization is the conventional "cubed" steak. More severe mechanical tenderization results in "ground" meat, and this extreme mechanical tenderization severely limits the mode of cooking the meat. Thus, neither aging nor mechanical tenderization is fully satisfactory.

One approach of chemical tenderization is that of enzyme tenderization. In this method, enzyme solutions are placed in and on the meat, and during storage of the meat at above freezing temperatures, the enzymatic action causes degradation of protein and a tenderization of the meat. However, with enzyme tenderization it is critical that the enzyme solution be relatively uniformly dispersed on and in the meat, since non-uniform dispersement will result in non-uniform tenderization and can result in over tenderization. Thus, if a large amount of the enzyme solution is localized in the meat, that portion will become exceedingly tender that even of a "mushy" consistency, while in other areas of the meat where the amount of enzyme solution is much lower, the meat may remain relatively tough. Thus, enzyme tenderization not only requires some aging time, but is difficult to control from the uniform tenderness point of view.

Another method of chemical tenderization is that of tenderization with phosphate solutions. These solutions will more quickly cause tenderization of the meat and long dwell times are not required, e.g. times of 4 to 8 days have been suggested (see U.S. Pat. No. 3,207,608). However, similar to enzyme solutions, the uniformity of tenderization depends upon the uniformity of dispersing the phosphate solutions in the meat, although the action thereof does not cause the excessive over tenderization, as do enzymes. However, the phosphate tenderization requires substantial amounts of water to be associated therewith, as opposed to the amount of water normally used in enzyme solutions. Typically, the amount of enzyme solution placed in the meat is only about 3%, whereas the amount of phosphate solution placed in the meat is ideally about 10%, i.e. the use of phosphates requires about three times as much solution to be placed in the meat. As a result, it has been difficult for the art to place that higher amount of tenderizer solution in the meat and, hence, achieve adequate tenderization with phosphate solutions.

In this latter regard, cut portions of meat have been allowed to dwell in phosphate solutions for considerable lengths of time. However, this process is exceedingly slow and not economical from a commercial point of view. In addition, it is difficult for the phosphates to permeate the entire cut portion of meat and unequal tenderization results.

More recently, the art has porposed combinations of mechanical and chemical tenderization, i.e. with enzymes and phosphates. For example, in U.S. Pat. No. 3,971,854, it is proposed that meat (in this case "choice" subprimal cuts) be mechanically tenderized by passing the meat through a multiple blade (or pin) type tenderizer where reciprocating blades completely penetrate the meat to tenderize it. Thereafter, an aqueous solution of phosphate is pumped into the meat by way of stainless steel needles and high pressure. However, pumping of phosphate solutions into the meat, either with or without mechanical tenderization is not entirely satisfactory, since a uniform dispersement of the phosphate solution in the meat is not achieved by way of a practical number of needles piercing the meat. Some success has been experienced by pumping the phosphate solution through the arterial network of whole hams, but this process is not applicable to cut serving portions of meat. In addition, trimmings from the subprimal cuts, when cutting into serving portions, cannot be used to produce pure beef or unflavored beef products. About 15%-35% of the usual subprimal cut is trimmings when cutting serving size steaks.

Canadian Pat. No. 792,201 suggests treating meat with either a liquid or dry phosphate composition, wrapping the treated meat in plastic film and allowing the meat to age for a period time. While this will provide an opportunity for the phosphates to penetrate the meat and effect some tenderization, the time period required for meaningful penetration of the phosphate is too long for commercial operation. Also see U.S. Pat. No. 3,625,708.

In U.S. Pat. No. 3,149,554 there is disclosed a tenderizer which has a pair of knife rolls which are mounted on axles for rotation and which are adapted to receive therebetween conveyed meat cuts. Each axle has a plurality of cuber knives with discrete relatively flat-faced cutting surfaces for placing cubing cuts in the meat passing between the rotating knives. Tenderizer solution is flooded on the meat as it passes between the knives to impregnate the meat with tenderizer solution. However, it was found that the foregoing arrangement, in practice, is difficult to control in terms of the amount of tenderizer impregnated into the meat cuts. In addition, the cuber knives were found to unduly destroy the integrity of the meat cuts, even with minimal use thereof, such that the tenderized meat had a texture and appearance similar to "cubed" steak, as opposed to the desired texture and appearance of a fresh steak.

U.S. Pat. No. 3,719,504 suggests that the foregoing difficulties may be avoided by the use of the combination of spray nozzles for spraying the tenderizer solution and the use of a plurality of elongated, pointed pins for perforating the meat, as opposed to the "cuber" knives. In this process the plurality of pins penetrate the meat from one side and immediately thereafter the apertured meat is sprayed with a tenderizing solution (unidentified) so that the solution can be received in the apertures prior to the apertures being closed by natural relaxation of the tissue around the apertures. However, in this case, the pins (of a Bettcher reciprocating tenderizer type) are quite narrow and the resulting apertures pick-up only about 3% of tenderizing solution, i.e. suitable only for enzyme solutions. Additionally, even that process causes difficulties, in that the apertures formed by the pins, while effective in receiving and retaining tenderizing solution, create considerable concentrations of tenderizing solution in the perforated areas and result in what is referred to in the art as "hot spots", i.e. spots where the meat becomes mushy and unpalatable.

To avoid the foregoing further developed problem, it has been further proposed in that process that, subsequent to penetrating the meat with the reciprocating pins and spraying, the meat be further cut with the rotataing cubing knives but only to the extent to further distribute the tenderizing solution and avoid the "hot spots". While this arrangement works reasonably well for tenderizing solutions which are to be contained in the meat in an amount of only about 3% or so, i.e. enzyme tenderizing solutions, difficulties have been experienced in containing greater amounts of tenderizing solutions in the meat, i.e. tenderizing solutions which depend upon phosphates for tenderization. Thus, when sufficient penetrations of pins are used to accommodate the higher amounts of tenderizing solutions, i.e. above about 5% or more, the many pin penetrations tend to undesirably mechanically disintegrate the meat, and produce an unpalatable soft texture, tending to be in the nature of "cubed" steak.

As can therefore be appreciated, the art has experienced considerable difficulty in reaching a satisfactory balance between mechanical disruption of the meat fiber for infusing the meat with tenderizing solution, and producing a texture of the tenderized meat which is acceptable to the consuming public. This has been a particular problem with less tender grades of meat, i.e. canner, utility, commercial and cutter grades. It would therefore be of considerable advantage to the art to provide a method for tenderizing meats while at the same time retaining a desirable texture of the tenderized meat. It would further be of advantage to the art to provide such processes wherein the tenderization may take place as an essentially continuous process, all the way through freezing, and where no lag period is required for action of a tenderizing solution.

OBJECTS OF THE INVENTION

It is therefore an object of the invention to provide a method for tenderizing cut portions of meat with both mechanical tenderization and tenderizer solution, but wherein the process may be practiced as a continuous process and with no tenderizing lag period required. It is a further object of the invention to provide such a process wherein the tenderized meat retains a desired and palatable texture. It is a further object of the invention wherein the process may be practiced, with accpetable results, when canner grade and like less tender meat portions are used in the process. Other objects will be apparent from the following description and claims.

BRIEF DESCRIPTION OF THE INVENTION

Broadly stated, the invention resides in a critical combination of mechanical and chemical tenderization, wherein the specific mechanical tenderization method enhances the chemical tenderization and vice-versa. The critical combination is that of slitting, rather than perforating or "cubing", cut portions of meat, and using a phosphate tenderizer, rather than an enzyme or other chemical tenderizer, and then again similarly slitting the cut portion to uniformly distribute the phosphate tenderizer solution. The process will not work with other than phosphate tenderizers and the phosphate tenderizers will not work with other than this dual slitting of the cut meat portions.

In more detail, the invention is based on three primary discoveries. First of all, it was discovered that in order to contain in the cut portions greater amounts of phosphate tenderizing solution, while at the same time not so mechanically disrupting the meat as to produce unpalatable results, a special slitting of the meat for retaining the tenderizing solution is required. As opposed to perforations or cubing cuts, practiced in the prior art, the present process produces relatively large "slits" in the meat, which are far more capable of readily receiving and retaining larger amounts of tenderizing solution, while not producing an unpalatable result. While not entirely clear, it appears that the greater surface opening of the slits, as opposed to perforations and cubing cuts will far more quickly receive and retain larger volumes of tenderizing solution, with less mechanical degradation of the texture of the meat. While not bound by theory, it appears that the wetting action of phosphate tenderizing solutions is more adaptable to be flowed into, received by, and retained by slits than by shaft-like perforations or cubing cuts.

Secondly, it was discovered that since slits far less mechanically degraded the texture of the meat, as opposed to the prior practices, considerably more slits could be placed on the surface of meat while yet retaining the desired meat texture. This is particularly true when all of the slits, which run in the same direction on the meat, are not continuous, but discrete, and do not greatly overlap each other. Thus, the integrity of the meat is retained, even though the surface of the meat is considerably opened for receiving phosphate tenderizing solution.

Lastly, it was discovered that even though the required higher volumes of phosphate tenderizing solution could be retained in the meat by using such slits, desired distribution of the phosphate solution was not achieved thereby. To further distribute the phosphate solution retained in the slits, it was found that further slits must be placed in the meat in close juxtaposition to the first slits retaining the phosphate solution. While some of these further slits may overlap the first slits retaining the phosphate solution, the majority of the slits will not overlap and the integrity and texture of the meat will be retained. The further slits provide pathways for flow and penetration of the phosphate solution from the first slits into the further slits. The mechanical movement of the meat during the further slitting accelerates this process and at the termination of the further slitting, the phosphate solution is relatively uniformly distributed in the meat.

With such relatively uniform distribution of the phosphate solution in the meat, tenderization of the meat will be exceedingly rapid, without "hot spots", while at the same time the desirable texture of the meat is retained. With such rapid tenderization, the meat may be processed as a continuous process, all the way through the freezing step, and no tenderization lag or dwell period is required.

This slitting-type mechanical tenderization and redistribution method, which provides a large number of openings for tenderizer solution, is also useful with enzyme tenderizing solutions. However, in this case there is no need for the second slitting step, although the second slitting step is innocuous when used with enzyme tenderizer solutions. The first slitting step and second redistribution slitting step of the present invention have their major advantages in use with phosphate tenderizer solutions.

Slits required by the present process may be easily placed in the meat with rotating blades having discrete, acute angle cutting surfaces along the periphery thereof. Acute angle in this regard, means that the cutting surface is generally disposed within an acute angle to a diameter of the blade, as explained more fully hereinafter.

Thus, the invention provides a method for tenderizing cut portions of meat having upper and lower generally planar and parallel portion surfaces. The process comprises slitting the portions by passing the portions into a plurality of rotating slitting blades having a plurality of discrete cutting surfaces on each blade along the periphery thereof. A series of closely spaced first cut slits thereby extend from at least one surface into the portions. The at least one slitted surface is sprayed, either simultaneously with and/or immediately subsequent to the first slitting step, with a tenderizing solution containing a tenderizing phosphate. The solution penetrates into and is retained in the first slits. The portions are then further slit, immediately subsequent to the spraying step, by passing the portions into a plurality of rotating slitting blades having a plurality of discrete cutting surfaces on each blade along the periphery thereof. A series of closely spaced further cut slits extend from that at least one surface into the portions. The further slits are close to or in part overlap the first cut slits and the solution penetrates from or flows from the first slits into the further slits during the further slitting and subsequent thereto. The portions containing the tenderizing solution are then immediately packaged and fast frozen.

The total volume of the first slits is sufficient to retain therein from 5%–16% of the tenderizing solution and the number of first and further slits is sufficient that the solution so penetrates or flows into the further slits from the first slits prior to the freezing step such that the solution is essentially uniformly dispersed in the portions and the portions are essentially uniformly tenderized.

BRIEF DESCRIPTION OF THE DRAWINGS

FIG. 1 is a block diagram of the overall basic steps of the process.

FIG. 2 is a diagrammatic illustration of the rotary blades and their arrangement as used in the present process for producing slits in the meat.

FIG. 3 is a diagrammatic illustration of the process showing the use of multiple sets of blades for producing the slitting of the meat, as required by the present process.

FIG. 4 is a perspective view of one of the blade assembly of FIG. 3.

FIG. 5 is a front view of the blade assembly of FIG. 4.

DETAILED DESCRIPTION OF THE INVENTION

As briefly noted in FIG. 1, the basic steps of the process are that of feeding pre-sized, shaped and cut meat portions of the meat into a first slitting step where the presently required slits are placed in the meat. Immediately thereafter, a phosphate tenderizing solution is sprayed on the meat. Since the slits remain open, at least for a short time, a simple spraying of the tenderizing solution is effective in placing the tenderizing solution in the slits, particularly since the slits receive and retain the solution to a substantially greater extent than perforations. Thereafter, a further slitting step is performed to place further slits in close juxtaposition to the first slits containing the tenderizing solution. This further slitting step causes the tenderizing solution to flow from the first slits into the further slits. Penetration from first to further slits is also involved in this redistribution of tenderizing solution, as well as the mechanical action of the further slitting. Thereafter, the tenderized meat may be packaged and frozen without a tenderizing lag or dwell period.

FIG. 2 shows, in diagrammatic form, rotatable slitting blades suitable for placing the presently required slits in the meat. Thus a pre-shaped, cut portion 1 of meat is passed into a plurality of rotating slitting blades 2 (with upper blades 2a and lower blades 2b). The blades may cut from only one surface of the meat, i.e. the upper surface 3 by using only blades 2a or blades 2a and 2b may be disposed above and below the meat (as shown in the drawings) so that both the upper surface 3 and the lower surface 4 will be simultaneously cut. If only the upper surface 3 is cut, and the meat portions are processed according to the present invention, it will be necessary to invert the so processed portions so that the previous lower surface 4 becomes the upper surface 3 and the portions are again processed in the manner described above. However, for economical reasons, it is preferred that both the upper and lower surfaces of the portions be processed at the same time. Thus, an upper blade 2a and a lower blade 2b will be used.

In practice, for economical reasons, there will be a plurality of upper and lower blades 2 extending transversely along the direction of the travel 5 of the meat, so as the meat passes therethrough a series of slits will be placed in the meat in the direction of travel of the meat.

Each slitting blade will have a number of discrete cutting surfaces 6 on the periphery thereof (also see FIG. 4). The number of cutting surfaces and the size thereof can be chosen such that the number and size of slits desired will be produced by the blades as the meat is cut by the blades. The blade thickness will generally be from about 0.02 to 0.05 inch thick to produce a corresponding width of slit. The blades are carried on a roll or axle 7 and 8, each axle carrying a plurality of axially disposed slitting blades 2, with the periphery of the blades on any one axle being spaced apart from the periphery of the blades on any other cooperating axle, e.g. the lower axle 7 and upper axle 8. The blades are also spaced apart from an adjacent blade by spacers 16 (see FIG. 4) which are, for example, from 1/64 to ½ inch wide, e.g. ⅛ inch wide. The path of rotation of the blades on an upper axle may also be laterally offset from the path of rotation of the blades on a cooperating lower axle. This is to insure that the blades 2a do not come into contact with blades 2b (e.g. a minimum clearance of 0.005 inch and usually a clearance of from 0.01 to 0.03 inch) and that the meat portions 1 may thereby be passed between counter-rotating blades 2a and 2b with the slits cut by both blades into both upper surface 3 and lower surface 4 of the meat without blade to blade engagement.

Since cut portions 1 will vary in thickness, at least to some extent, the axle carrying at least one set of the blades should be resiliently mounted so that it may move up and down in relation to different thicknesses of meat. This will provide a relatively constant slit depth in portions of varying thicknesses. Preferably, the resilient mounting is by way of an air cylinder (not shown) so that a constant pressure is placed on the resilient axle, irrespective of the precise thickness of meat passing through the counter-rotating blades. In addition, the resilient mounting of the blades will avoid damage to the blade rolls when, inadvertently, insufficiently tempered meat or meat containing bone is passed through the blade rolls.

While not necessary, the rotating slitting blades may have guide members 10 and 11 to guide and support the meat portions 1 as they pass between the rotating blades 2. In addition, a conveying means 13 for conveying the meat to the rotating blades and a conveying means 14 for removing the cut meat from the blades will be provided.

The cutting surface 6 of the blades will be so configured that the slit made in the meat by each cutting surface will be less than 1 inch in length, i.e. the length of the sharpened cutting surface 6, at the desired depth of penetration, will, during rotation in the meat, produce a 1 inch slit. More preferably, the cutting surface 6 will be configured to produce slits of less than ½ inch in length but greater than ¼ inch. To achieve slitting of this nature, acute angle cutting surface 6 is generally disposed within an acute angle $\theta$, formed between a diameter of the blade 17 and the general centerline 18 of the cutting surface 6 (see FIG. 2). The angle $\theta$ will generally be between 45° and 20°.

Also, the number of blades arranged on any axle will be such that the slits placed on the meat are relatively close together, in the direction transverse to the direction 5 of the travel of the meat. Ideally, the slits are within ½ inch of the next adjacent slit in the direction transverse to the travel of the portions.

Additionally, the cutting surfaces 6 should be configured such that the first slits extend into the slit portion to less than about ½ of the thickness thereof. The further slits may extend into the cut portion about the same amount, but since these further slits are primarily for redistributing the phosphate solution in the first slits, the degree into which these slits extend in the cut portions need not be as great. Thus, the further slits may extend into the portions to less than about ⅓ of the thickness thereof.

As noted above, it is important that the slits be placed in the cut portions in a number and of a volume sufficient to retain the higher amounts of phosphate solution required for tenderization. However, also as noted above, the number and extent of slits should not be so great as to substantially destroy the integrity of the cut portions. If the integrity of the cut portions is destroyed, then upon cooking, the cut portions will tend to disfigure and will not have the appearance of a unprocessed beefsteak, or the like. While the ultimate number of slits which can be placed in the meat will vary with the particular kind of meat, generally speaking, the further slits should not be closer to the first slits than approximately 1/16 of an inch, and more usually about ⅛ inch or so. When slits have the depth, in the range described above, as well as lengths, as described above, this close spacing of the slits will still not substantially degrade the integrity of the cut portions.

It is not necessary that all of the slits be produced with one axle carrying a plurality of blades or even a set of two axles carrying a plurality of blades. The slits may be achieved by a plurality of sets (upper and lower axles carrying a plurality of blades), as shown in FIG. 3. Thus, the slitting blades 2 in both the first and further slitting steps may comprise two counter-rotating axles 20 and 21 carrying a plurality of axially disposed blades with cutting surfaces 6, and with the periphery 22 of the blades on one axle being spaced apart from the periphery 22 of the blades on the other axle. Thus, as the portions are passed between the counter-rotating blades the slits are cut therein. Two sets of those axles and blades may be used for each of the first and further slitting steps, as shown in FIG. 3, i.e. the first slitting step has two sets of two axles/blades (20, 21, 23 and 24) and the further cutting step has two sets of two axles/blades (25, 26, 27 and 28). Indeed, any number of blades may be used, as desired, to place the slits in the meat portions, so long as the slits ultimately produced in the cut portions are in the nature as described above.

Also as shown in FIG. 3, after the first cutting step, the tenderizing solution is placed on the meat (while held on the conveyor) by spraying devices 29 and 30. The further slitting step is then achieved, as noted above, and the slit portions with the tenderizing soltuion therein 31 are conveyed to a packaging machine 32 for packaging, i.e. individually packaging or packaging as a group and then conveyed to a freezer room 33 for fast freezing. This may be a continuous process and after the further slitting step, normally speaking, the packaging and fast freezing of the so processed portions will immediately take place. This does not mean, however, that there cannot be some lag or dwell period after the further slitting, but it does mean that such lag or dwell period is not required. Thus, normally speaking, after the further slitting step, the lapsed time between that further slitting step and introducing the portions to the fast freezing step will not be greater than about one hour, allowing for normal production and handling, and usually only about a quarter hour or less. Indeed, normally speaking, the time between spraying the meat portions with the first slits and packaging and fast freezing the portions will normally be no greater than two hours and usually no greater than one hour. Indeed, this entire process will normally be accomplished in a time period no greater than one-half hour.

The slitting time will be relatively short, but this time will depend upon the length of the slit and the depth of the slit desired, as well as the number of desired slits. In addition, slitting will be more difficult or easier depending upon the nature of the meat being cut and its temperature. Partially frozen meat, of course, will be more difficult to cut and for this reason it is preferred that the cut portions passing through the process, up to the freezing step, be at a pliable temperature, i.e. a temperature in which the meat is not rigid. When the meat portions are preformed beefsteak portions, pliable temperatures begin at about 26° F. The lower the temperature the better, and thus, it is preferred that the temperature of the beef portions be between about 27° and 29° F.

The tenderizing phosphate solution may contain any of the known tenderizing phosphates. These tenderizing phosphates are generally alkali metal or alkaline earth metal phosphates. However, for practical use, it is preferred that the phosphate is either sodium tripolyphosphate or sodium hexametaphosphate, or sodium acid pyrophosphate, or tetra sodium pyrophosphate or combinations thereof. The concentration of the phosphate in the solution will normally be between about 3 and 10% and this will achieve a phosphate pick-up in the meat (on a dry basis) of about 0.5%. However, phosphate pick-up of between about 0.3 and 1% is normally satisfactory. This pickup is, of course, dependent upon the amount of phosphate solution, as well as the concentration of phosphate therein. As noted above, substantial amounts of water must be associated with the phosphate, and the meat should pick-up from about 5% to 16% phosphate solution. Generally speaking, however, the amount of solution retained in the so processed portions will be approximately 10%, i.e. weight of steak+solution−weight of steak÷weight of steak and ×100.

The phosphate solution may contain other non-essential ingredients, such as bactericides (the sprayed phosphate solution may be recirculated as it drips from the sprayed meat), fungicides or other preservatives, wetting agents (e.g. a Tween), antioxidants, viscosity control agents, e.g. gums and the like, or even other tenderizing ingredients such as wherein the solution also contains a tenderizing enzyme or mixture of enzymes, e.g. ficin and bromelain in concentrations of 0.1% to 2%.

The product of the present invention has more natural beef flavor than enzyme tenderized meat and far superior texture, since there has been no protein degradation by the enzyme. The tenderness is at least as good as enzyme tenderized meat; the color is brighter; the color does not darken as quickly after thawing; the meat will "purge" (weep) considerably less; does not visually shrink and can be safely thawed for 5 days versus 2 days for enzyme tenderized meat. No over tenderization is experienced and the meat is more juicy than enzyme tenderized meat.

It has also been suprisingly found that slits of the present nature have a tendency to seal shortly after being cut. Thus, these narrow, but deep slits can receive the phosphate tenderizing solution immediately after cutting and then re-close or seal prior to packaging and freezing. This allows a larger amount of solution to be retained by and permeate into the meat even with the handling necessary for packaging and freezing. Further it has been surprisingly found that even when thawed, the partially sealed slits will be virtually invisible and upon cooking, e.g. broiling, the slits will essentially totally seal. This prevents natural juices and the additional moisture added by way of the solution from cooking out of the meat and provides the juicy mouth feel of unprocessed tender grades of meat, e.g. choice grade.

It has also been surprisingly found that meat processed according to the present invention can be cooked in the restaurant immediately after thawing. In fact, when necessary, steaks can be fast thawed or brought to a tempered state (approximately 26° F.–30° F.) and immediately cooked without loss of tenderness. This, for example, can be done in a microwave oven. Frozen enzyme treated steaks are normally held after thawing at refrigerator temperatures for 8 to 16 hours in order to permit adequate dispersement of the enzymes solution and to insure a uniformly tenderized steak. The present improvement is important in the operation of restaurants, in that frozen steaks can be more quickly readied for cooking, resulting in better inventory control and lower inventories.

The invention will now be illustrated by the following examples, but it is to be understood that the invention is not limited to these examples, but extends to the scope of the foregoing disclosure and the following claims. In the examples, as well as in the foregoing specification and following claims, all percentages and parts are by weight, unless otherwise specified.

EXAMPLE 1

Boneless beef striploins were inspected, and fat and tail trimmed, as needed. The striploins were frozen in a blast freezer, and then tempered in a tempering room held at an air temperature between 28°–30° F., with brisk air movement. When the striploins were equilibrated to temperatures between 27°–29° F., they were molded in a Bettcher* molding press and then sliced with a Bettcher* slicer to a predetermined desired steak weight.
*Trademark The steaks were inspected and offcuts and wedgecuts culled out. The selected steaks were conveyed by a conventional wire belt conveyor into a double set of rotary slitting blades of the configuration shown in FIGS. 3 and 4. Immediately after cutting, the steaks were continuously conveyed through a spraying machine for applying the tenderizing solution (described in detail below). The amount of spray applied produced a pick-up of from 8–10%. The desired pick-up is adjustable by changing the speed of the spray tunnel conveyor, or throttling or opening wider the valve feeding the sprays from the pump. The spray nozzles were wide deflector-type and produced a flat spray pattern with low impact characteristic (manufactured by Spray Systems Company No. ⅛ K1 to No. ⅛ K20 with 0.033 inch to 0.148 inch orifice diameters), with liquid pressure between 10 psi and 60 psi. A closed sanitary dairy pressure filter is provided to filter out the fine fat and meat particles from recirculated solution.

From the spray tunnel the steaks were conveyed to further double set of rotary slitting blades where the solution is further redistributed throughout the steak and any free liquid remaining on the surface of the steak is forced into the steak interior. From the further double set of rotary slitting blades the steaks were packaged in plastic film (bags), and boxed. The boxed steaks were blast frozen.

The rotary blades (first and further sets) were mounted on an axle with spacers thereinbetween. The spacers were 0.139 inch wide so that spaces between blades were approximately ⅛ inch. This arrangement will handle boneless steaks of up to 3 inches thick, although the steaks used in this example were approximately 1 inch to 1½ inches thick. The thickness of the blades are from 0.030 inch to 0.040 inch in thickness. The blades of the upper axle were laterally offset from the blades of the lower axle and the peripheries of the upper and lower blades had a clearance of about 0.01 inch. The individual blades (as shown specifically in FIG. 4) were shaped so that the blade enters the steak close to the point of the cutting surface, and the cutting surface penetrates the steak and membranes and withdraws from the steak in a smooth motion. This smooth cutting action is enhanced by the ground sharp side of the cutting surface which also prevents breakage at seams in the steaks, particularly rib eye steaks and sirloin butts. This is opposed to the pounding action of reciprocating knife blades and pins, such as the Bettcher* bladed tenderizer, which tend to break the steak at the membranes seams.

*Trademark

Because of the semi-rigidity (pliable) condition of the steaks, there is a slight displacement of the steaks, so they are slightly wider and longer after passing through the process.

Thereafter, some of the frozen steaks were thawed. After thawing the steaks relaxed, due to numerous slits, and upon cooking provided greater plate coverage than conventionally prepared steaks. The absorption of the solution slightly swelled the cooked steaks, which also gave larger surface area of the cooked steaks than conventionally prepared steaks.

The slits in the steaks partially seal themselves during the period after passing from the further set of blades and prior to blast freezing. During cooking, the steaks complete this sealing process, so that the cooked steak is virtually indistinguishable in surface texture from a steak which has not been slit.

The tenderizer solution formulation was as follows:
Seasoning mix (salt, sugar hydrolyzed vegetable protein, dextrose, monosodium glutamate, beef extract and spices)—12.5 lbs.
Sodium tripolyphosphate—8.75 lbs.
Water—165. lbs.
The phosphate was mixed with the water (at lukewarm temperature) until dissolved and then the spices are mixed.

EXAMPLE 2

The procedure of Example 1 was repeated except that only one set of upper and lower slitting blades were used (i.e. 20 and 21 of FIG. 3). Although steaks were tenderized to some extent, the steaks required a dwell period of at least 2 hours and up to 6 hours in a 35° F. cooler to become acceptably tender.

EXAMPLE 3

The procedure of Example 1 was repeated except that only the first double set of slitting blades were used (i.e. 20, 21, 23, 24 of FIG. 3). With this procedure the dwell period of Example 2 could be eliminated, but the tenderness of the steaks was only marginally acceptable.

EXAMPLE 4

Cooking tests were conducted by broiling steaks on a charbroiler, in the manner performed in franchise steak houses. Sample A was constituted by untreated control steaks. Sample B was constituted by the steaks processed according to Example 2, except that no dwell period was provided. Sample C was constituted by steaks processed according to Example 3. Sample D was constituted by the steaks processed according to Example 1. Sample E was constituted by steaks processed in a conventional manner with a 3% pick-up of a conventional enzyme solution (ficin).

The following 1–5 scale test was used by blind panelists to rate all samples:

| RATING | DESCRIPTION OF TENDERNESS |
|---|---|
| 5 | Extremely tough clearly unacceptable |
| 4½ | Very tough - unacceptable |
| 4 | Moderately tough - marginally acceptable |
| 3½ | slightly tough - acceptable |
| 3 | Desired tenderness - similar to U.S.D.A. Prime |
| 2½ | Slightly overtender - acceptable |
| 2 | Moderately overtender - acceptable |
| 1½ | Overtender - undesirable but acceptable |
| 1 | Extremely overtender - undesirable but marginally acceptable |

The average results of all panelists were as follows:

| COOKED STEAK TREATMENT | RATING |
|---|---|
| Sample A (control-untreated) | 4¼ |
| Sample B (Example 2) | 3½ |
| Sample C (Example 3) | 3¼ |
| Sample D (Example 1) | 3 |
| Sample E (enzyme treated) | 3¼ |

For purposes of this test scale, a steak must have a rating of under 4 to be saleable. For most franchised steak houses, the rating should be under 3½, preferably as good as 3¼. Of course, the target value of tenderness provided by the tenderizing process is that which is similar to U.S.D.A. prime, i.e. 3. Over tenderization is to be avoided, since it produces a "mushy" or "processed" mouth-feel.

EXAMPLE 5

Boneless strips were cut into 8 oz. paired steaks with one steak of each pair being treated according to the procedure of Example 1 to pick up 10% by weight of phosphate tenderizer. The steaks were frozen and thawed for 48 hours and cooked on a heavy cast iron electric grill at 350° F. for 4 minutes on each side and to the same degree of doneness (medium done). The following results were obtained.

| PAIR | UNCOOKED WT. GRAMS | COOKED WT. GRAMS | LOSS OF WT. GRAMS | % SHRINK |
|---|---|---|---|---|
| #1 Control | 211.4 | 159.6 | 51.8 | 24.5 |
| #1 Tenderized | 233.6 | 190.9 | 42.7 | 18.3 |
| #2 Control | 195.7 | 164.5 | 31.2 | 15.9 |
| #2 Tenderized | 219.8 | 192.6 | 27.2 | 12.4 |

| | -continued | | | |
|---|---|---|---|---|
| #3 Control | 186.3 | 135.4 | 50.9 | 27.3 |
| #3 Tenderized | 200.9 | 155.0 | 45.9 | 22.8 |
| #4 Control | 193.3 | 141.0 | 52.3 | 27.0 |
| #4 Tenderized | 211.0 | 171.7 | 39.3 | 18.6 |

The foregoing data may also be presented as follows for ease of comparison.

| PAIR # | 1 | 2 | 3 | 4 |
|---|---|---|---|---|
| Cooking loss Control % | 24.5 | 15.9 | 27.3 | 27.0 |
| Cooking loss Tenderized % | 18.3 | 12.4 | 22.8 | 18.6 |
| Cooking loss % Difference | 6.2 | 3.5 | 4.5 | 8.4 |

Thus, an average gain of 5.6% on cooked weight of presently tenderized steaks is achieved over that of untenderized steaks.

Thus, the objects of the invention have been met. It will be appreciated from the foregoing detailed disclosure, that various modifications will be apparent to those skilled in the art and those modifications are intended to be embraced by the spirit and scope of the following claims.

What is claimed is:

1. A method for tenderizing cut portions of meat having upper and lower generally planar and parallel surfaces, comprising:
   (1) slitting said portions by passing the portions into a plurality of rotating slitting blades having a plurality of discrete acute angle cutting surfaces on each slitting blade along the periphery thereof, wherein a series of closely spaced first cut slits extend from at least one surface into the said portions, and said slits have a length between $\frac{1}{4}$ inch and 1 inch and a width of between 0.02 and 0.05 inch;
   (2) spraying the said at least one surface, either simultaneously with and/or immediately subsequent to said first slitting step, with a tenderizer solution containing a tenderizing phosphate, wherein the solution penetrates into and is retained in the said first slits;
   (3) further slitting the portions, immediately subsequent to said spraying step, by passing the portions into a plurality of rotating slitting blades having a plurality of discrete acute angle cutting surfaces on each slitting blade along the periphery thereof, wherein a series of closely spaced further cut slits extend from the at least one surface into said portions, and said slits have a length between $\frac{1}{4}$ inch and 1 inch and a width of between 0.02 and 0.05 inch, wherein the further slits are close to or in part overlap the said first cut slits and the said solution penetrates from or flows from the said first slits into the said further slits during said further slitting and subsequent thereto; and then
   (4) immediately packaging and fast freezing the so processed portions;
   wherein the total volume of the first slits is sufficient to retain therein from 5% to 16% of the said solution, and the number of first and further slits is sufficient that solution so penetrates or flows into the said further slits from the first slits prior to the freezing step such that the solution is essentially uniformly dispersed in the portions and the portions are essentially uniformly tenderized.

2. The method of claim 1 wherein subsequent to step 3 and prior to step 4, any uncut surface of the portions is processed according to steps 1 through 3.

3. The method of claim 1 wherein both the upper and lower surfaces of the said portions are simultaneously processed.

4. The method of claim 1 wherein the number of discrete cutting surfaces, on each slitting blade, and the linear spacing between each cutting surface is such that the desired number of slits is produced.

5. The method of claim 1 wherein the time period between steps 2 and 4 is no greater than 2 hours.

6. The method of claim 5 wherein the time period is no greater than 1 hour.

7. The method of claim 6 wherein the time period is no greater than $\frac{1}{2}$ hour.

8. The method of claim 1 wherein the slits of both the first and further slittings are less than 1 inch in length.

9. The method of claim 8 wherein the slits are within $\frac{1}{2}$ inch of the next adjacent slits in the direction transverse to the travel of the portions.

10. The method of claim 1 wherein the said meat portions are preformed beefsteak portions.

11. The method of claim 10 wherein the portions, during steps 1 through 4, are at a pliable temperature.

12. The method of claim 1 wherein the phosphate is an alkali metal or alkaline earth metal phosphate.

13. The method of claim 12 wherein the phosphate is sodium tripolyphosphate, sodium hexametaphosphate or sodium acid pyrophosphate.

14. The method of claim 1 where the concentration of phosphate in the solution is between 3 and 10%.

15. The method of claim 1 wherein the solution also contains a tenderizing enzyme.

16. The method of claim 1 wherein the first slits extend into the portion to less than about $\frac{1}{2}$ of the thickness thereof and the further slits extend into the portion to less than about $\frac{1}{2}$ of the thickness thereof.

17. The method of claim 1 wherein the said slitting blades in both the first and further slitting steps comprise two counter-rotating axles, each carrying a plurality of axially disposed blades, with the periphery of the blades on one axle being spaced apart from the periphery of the blades on the other axle, wherein the portions are passed between the counter-rotating blades and the said slits are cut therein.

18. The method of claim 17 wherein at least one axle is resiliently mounted whereby relatively constant slit depth is achieved in portions of varying thickness.

19. The method of claim 17 wherein two sets of the said axles and blades are used for each of the first and further slitting steps.

20. The method of claim 1 wherein the amount of solution retained by the so processed portions is approximately 10%.

* * * * *